United States Patent Office 3,459,573
Patented Aug. 5, 1969

3,459,573
NACREOUS PIGMENT OF BLACK PEARL TONE
Yoshio Morita, Tokyo, Takaji Watanabe, Omiya-shi, Saitama-ken, Hisao Suzuki, Tokyo, and Junji Kawamura, Tokorozawa-shi, Saitama-ken, Japan, assignors to Koppers Company, Inc., a corporation of Delaware
Filed Dec. 19, 1966, Ser. No. 602,642
Claims priority, application Japan, Dec. 28, 1965, 40/80,680
Int. Cl. C09c 1/14; C09d 5/36
U.S. Cl. 106—291    10 Claims

ABSTRACT OF THE DISCLOSURE

Iridescent, substantially uniform, light-transmitting crystalline platelets of a lead salt, such as basic lead carbonate, are converted to highly lustrous crystalline platelets of black pearl tone by forming, through chemical reaction, a uniform layer of mixed lead sulfide salts on the surface of the platelets. The iridescent platelets, which have an optical thickness of about 180–2000 m$\mu$, are treated in aqueous solution with an inorganic sulfide, such as sodium sulfide. The resulting chemical reaction on the surfaces of the platelets provides uniform upper and lower surface layers of mixed lead sulfide salts, the optical thickness of each layer being about 10–30 m$\mu$. A nacreous pigment made by the conventional dispersion of the novel platelets of black pearl tone is used in the production of simulated black pearls and as a finish for acrylic and polyester castings.

---

Figure 1:
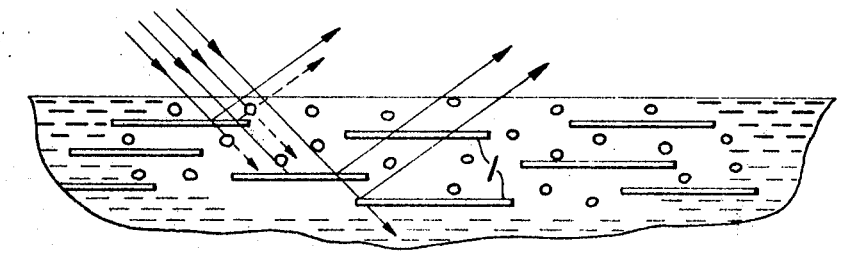
Figure 2:
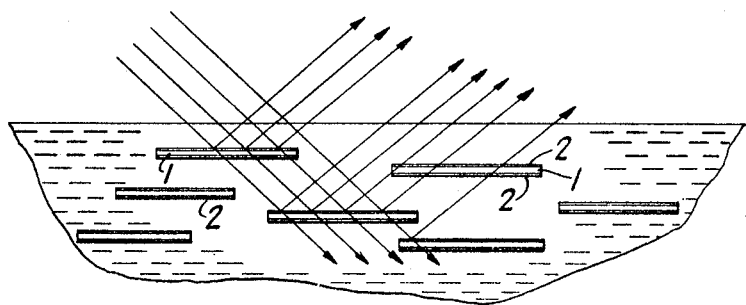
Figure 3A:
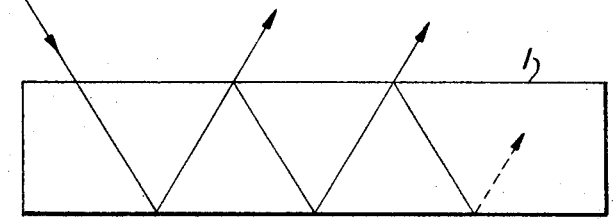
Figure 3B:
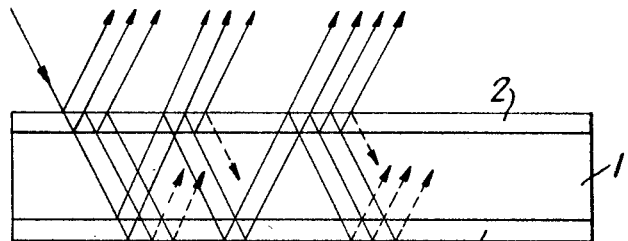

In the manufacture of simulated or artificial pearls, a very considerable effort has been directed to the production of an artificial product that approaches, both in tone and in luster, the quality of the natural pearl. The development of iridescent nacreous pigments, which assume their color because of light interference phenomena, has lead to the simulation of the valuable pink pearl by providing a pink artificial pearl of good luster. All efforts to simulate the highly esteemed black pearl have been heretofore unsuccessful.

Attempts have been made to provide a simulated black pearl by coating the surface of beads, which have been previously toned black in color, with iridescent pearl lacquer. Such attempts have resulted in failure. The transmitted color of the iridescent nacreous pigment is completely absorbed by the black undercoating and only reflected color can be seen. Unfortunately, the black tone of the undercoating is completely masked by the iridescent pigment. Other attempts to make an artificial black pearl involve coating the surface of beads with a mixture of iridescent nacreous pigment and black pigment or dye. The resulting artificial pearl has a dull black tone of very poor luster and in no way resembles the natural black pearl.

We have discovered a method of making a nacreous pigment of black pearl tone by forming very thin layers of mixed lead sulfides on the surfaces of iridescent nacreous crystalline platelets. By controlling the thickness of the layers of mixed lead sulfide salts, we have obtained an enhanced reflectivity, characteristic of a triple film in which the central film is of fixed thickness and of lower refractive index and the upper and lower films are of varying thickness and of higher refractive index. Surprisingly, the enhanced reflectivity thus obtained is sufficient to overcome the loss by absorption caused by the thin black layers of mixed lead sulfide salts. Simulated pearls made from nacreous pigments containing our novel platelets have a lusted and tone approaching that of the natural black pearl.

In accordance with the invention there is provided a highly lustrous nacreous pigment of black pearl tone by the conventional dispersion of substantially uniform crystalline platelets, characterized by strong reflectance and weak transmittance of incident light and an optical thickness of about 180–2000 m$\mu$. The individual platelets consist of a core of a lead salt having an index of refraction of about 1.8–2.1 and uniform upper and lower surface layers of mixed lead sulfide salts. The optical thickness of the individual surface layers is controlled within a range of about 10–30 m$\mu$.

The novel platelets of the invention are made by suspending substantially uniform iridescent nacreous light-transmitting crystalline platelets having an optical thickness of about 180–2000 m$\mu$ in an aqueous medium, which may contain lead ion in a concentration of up to 0.01 mole per liter. The iridescent platelets consist of a lead salt having an index of refraction of about 1.8-2.1. To the aqueous suspension there is added at a rate of 0.001–0.02 mole of sulfur ion per mintue, a solution of an inorganic sulfide, the sulfur ion concentration of the solution being 0.0001–0.03 mole per liter. There is formed by chemical reaction on each surface of the platelets a uniform surface layer of mixed lead sulfide salts controlled to an optical thickness of about 10–30 m$\mu$.

The difference in optical effects exhibited by the necreous pigment of the present invention and the prior unsuccessful attempts to provide a pigment of black pearl tone is shown dramatically by the accompanying drawing in which:

FIG. I is a view of the reflection of incident light by oriented iridescent nacreous crystals blended with black pigment particles in a pearlized lacquer;

FIG. II is a view of the reflection of incident light by oriented crystalline platelets of the present invention; and FIGS. III–A and B are detailed views of the individual platelets shown in FIGS. I and II, respectively. FIG. III–A shows the simple multiple reflection obtained in a single layer platelet, and FIG. III–B shows the complex multiple reflection obtained according to the invention as a result of the triple film effect.

It is seen from FIG. I that in the case of black pigment blended with iridescent nacreous crystals 1, much of the incident light is absorbed or irregularly reflected by the particles of the black pigment. The luster and color of the nacreous pigment are both reduced, resulting only in a stained black tone and weak luster when applied to simulated pearls. If a black dye is substituted for the black pigment, similar unsatisfactory results are obtained, unless the amount of dye used is so small that no black tone can be produced.

In contrast therewith, as shown in FIG. II, the novel pigment of the invention shows no irregular reflection or, essential loss of luster. As noted above, the individual platelets of the invention consist of a core 1 of a lead salt having an index of refraction of about 1.8–2.1 and upper and lower surface layers 2 of mixed lead sulfide salts having an index of refraction of about 3.9. Since the surfaces of the crystalline platelets are chemically coated with very thin layers of lead sulfide 2 without substantially increasing the thickness of the individual platelets, reflection of the light is correct and the reflected light is effectively toned black by continuous multiple reflections. The efficient toning obtained by the correct multiple reflection reduced loss of reflected light by absorption to a very minimum amount.

The multiple reflections shown in FIGS. III–A and B are infinite series of reflections, the continuous nature of which is indicated by the dotted lines. In the single layer platelet shown in FIG. III–A, the multiple reflection is very simple, whereas in the triple layer platelet of FIG. III–B, the reflection is repeated many more times and, therefore, the amount of reflected light is considerably enhanced.

The starting materials used in providing the platelets of the present invention are the light-transmitting iridescent nacreous pigments first described by Dr. Sei Hachisu in an article entitled "Pearl Pigment II," which appeared in the Journal of Color, vol. 32, No. 3, March 1959. The iridescent pigments consist of tiny crystalline platelets of lead salts such as basic lead carbonate, lead hydrogen arsenate, lead phosphate, lead hydrogen phosphate, and lead iodide. These lead salts have an index of refraction range between about 1.8 and 2.1; e.g., basic lead carbonate, 1.94–2.09; lead hydrogen phosphate, 1.84; and lead hydrogen arsenate, 1.90–1.97. The optical thickness (thickness in $m\mu$ multiplied by the index of refraction) of the iridescent platelets ranges between about 180 and 2000 $m\mu$.

The iridescent crystals assume color because of optical interference phenomena. Those crystals having an optical thickness in the range of 180–200 $m\mu$ are yellow to gold in color; those being an optical thickness of 240 $m\mu$ are red; and those in the range of 300–400 $m\mu$ are blue to green. At an optical thickness of 600–640 $m\mu$, the yellow color is once again obtained, this being the second order of interference. Although iridescent pigment having an optical thickness of up to 2000 $m\mu$ can be used for purposes of the invention, those crystals of the first order of interference, with an optical thickness of 180–400 $m\mu$, are preferred, because better luster is produced by thinner crystals.

To obtain the platelets of the invention, the light-transmitting iridescent platelets are suspended in aqueous solution which preferably, but not necessarily, contains a soluble lead salt, such as lead acetate, lead nitrate, or lead chloride, in an amount corresponding to lead ion concentration below 0.01 mole per liter. If the concentration of lead ion is greater than 0.01 mole per liter, the addition of sulfur ion causes free precipitation of lead sulfide and the chemical reaction and the resulting deposition on the crystal surface are adversely affected. At lead ion concentrations below 0.005 mole per liter, there is almost no free precipitation. At concentrations between 0.005 and 0.01 mole per liter, a small amount of free precipitation occurs, but such precipitation does not measurably interfere with the reaction at the crystal surface and the small amount of free lead sulfide by-product can be removed by decantation. The preferable range of lead ion concentration is 0–0.005 mole per liter.

The suspension is formed using conventional surfactants, such as the polyoxyethylene esters and ethers, alkylbenzene sulfonates, polyoxyethylene alkylbenzene sulfonates, polyoxyethylene alkylamines, or mixtures of these surfactants. Good dispersion in the system is important in order to obtain the homogenous and flat layer of lead sulfide salts on both sides of the crystalline platelets.

It is helpful, but not necessary, to add a buffer solution to the suspension to assist in maintaining a steady rate of reaction. Useful buffers can be made from combinations of ammonium acetate, sodium acetate, sodium citrate, sodium hydrogen phosphate, potassium hydrogen phosphate, borax, and sodium chloride.

The thickness of the outer layers of mixed lead sulfide salts is of paramount importance and is controlled primarily by (1) the sulfur ion concentration of the solution used to treat the iridescent crystals and (2) the rate at which that solution is added to the suspension. In the sulfiding reaction the iridescent crystalline platelets of, for example, basic lead carbonate, upon treatment with sulfur ion undergo a partial reaction at the surface of the crystals to form a double salt, such as $PbS \cdot Pb(OH)_2$. The resulting blacklayer therefore consists of a mixture of lead sulfide and this double salt.

The refractive index of lead sulfide is about 3.9. Because of the difference in index of refraction between lead sulfide and that of the iridescent pigment (approximately 2) and by careful control of the optical thickness of the lead sulfide layers between 10 and 30 $m\mu$, the reflectivity of our novel platelets is, because of the triple film effect, not less than and in some cases greater than that of the original iridescent crystals. Unlike the iridescent crystals, the novel platelets of the invention show strong reflectance and weak transmittance of incident light. Since the suspension of iridescent platelets used in the invention contains no lead ion or is measurably deficient in lead ion, the lead ion required for the formation of the mixed lead sulfides is obtained from the surface of the iridescent crystals. Thus, the sulfiding reaction reduces the optical thickness of the central layer and the resulting triple film platelet is of substantially the same optical thickness as the iridescent platelet used as a starting material. The reduction of thickness of the original crystals by the consumption of lead ion is of considerable importance in obtaining the pigments of enhanced luster in accordance with the invention. Iridescent crystals are inferior in luster to ordinary white crystals because the iridescent crystals have a much greater optical thickness. Simple deposition, rather than chemical reaction, on the crystal surface would increase the optical thickness of the crystals and the improved luster obtained by the method of the invention could not be achieved.

The thickness of the individual outer layers of lead sulfide is controlled, as noted above, by the sulfur ion concentration during the reaction to an optical thickness between about 10 and 30 $m\mu$. The preferred thickness varies within this range, depending upon the color of the iridescent crystals. For the green crystals it is desirable that the optical thickness of one sulfide layer should be about 10 $m\mu$, the upper limit being about 20 $m\mu$. The thickness of each sulfide layer formed on the gold crystals can be as high as 30 $m\mu$.

The sulfide layers are formed by adding to the suspension of iridescent pigment prepared as described hereabove, a dilute aqueous solution of an inorganic sulfide, such as sodium sulfide, potassium sulfide, hydrogen sulfide, or ammonium sulfide. Hydrogen sulfide can be introduced as a gaseous solution, provided that it is diluted to the proper concentration with an inert gas, such as nitrogen or carbon dioxide (which is inert, except in the case of basic lead carbonate). The solution containing the sulfur ion is added slowly with stirring and there is gradually formed on the surfaces of the iridescent crystals the thin layers of mixed lead sulfide salts.

The concentration of sulfur ion in the solution of inorganic sulfide added to the suspension of iridescent platelets is carefully controlled in a range between 0.0001 and 0.03 mole of sulfur ion per liter. If the concentration of sulfur ion exceeds 0.03 mole per liter, the crystals are affected by a sudden partial pH change. At concentrations below 0.001 mole per liter, the crystals tend to coagulate because of the dilution of the dispersants. The preferred range of sulfur ion concentration is between 0.001 and 0.015 mole per liter. To achieve this concentration the required amount, for example, of sodium sulfide is 50–150 g. of one percent solution per 50 g. of crystals. If gaseous hydrogen sulfide is used as a reactant, the concentration of hydrogen sulfide in the gas should be reduced to five percent or less.

The sulfur ion is added to the suspension of iridescent crystals at a rate of between 0.001 and 0.02 mole per minute. If the rate of addition exceeds 0.02 there results free precipitation of lead sulfide or uneven deposition on the crystal surface. At a rate of addition below 0.01 mole per minute, the reaction time is unduly prolonged. Preferably, the rate of addition of sulfur ion is controlled within the range of 0.01–0.015 mole per minute.

The consumption of sulfur ion required to provide the necessary optical thickness of sulfide layers is 0.0128–0.0384 mole of sulfur ion per 100 g. of crystals. In the case of sodium sulfide this corresponds to 1–3 g. of sodium sulfide per 100 g. of crystals.

For optimum results the temperature of the reaction and the pH of the suspension should be maintained within certain limits. Any temperature between 0 and 100° C. is suitable, but best results are obtained at 10–30° C. The pH of the reaction varies with the chemical constitution of the iridescent pigment. Basic lead carbonate requires a pH of 6–10, while lead hydrogen arsenate and lead hydrogen phosphate require a pH below 4. In the case of the lead arsenate and phosphate salts, if the pH falls below 2, there is danger of crystal dissolution.

After the layer of mixed lead sulfide is formed on the surfaces of the crystals, the resulting crystalline platelets of black pearl tone are recovered by decantation and washed several times with purified water. The purified crystals are converted by the conventional flushing processes used in the processing of ordinary nacreous pigment to a paste that is convenient for usage.

When the novel lustrous pigment of black pearl tone made according to the invention is used in the manufacture of simulated pearls, a black pearl of good luster is easily obtained. Especially good results, approaching the appearance of the natural black pearl, are obtained by alternately coating the bead with the nacreous pigment of this invention and ordinary iridescent nacreous pigment. The use of the pigment of the invention for acrylic and polyester castings gives a finish very similar in appearance to the natural black lip oyster, *Pinctada margaritifera*.

Our invention is further illustrated by the following examples:

Example I

A 50 g. quantity of basic lead carbonate crystalline platelets of greenish-blue iridescent reflected color (optical thickness about 400 m$\mu$) was suspended in 100 cc. of an aqueous solution of lead acetate having a lead ion concentration of about 0.005 mole per liter. A 0.1 g. quantity of polyoxyethylene sodium alkylbenzene sulfonate and 1 g. of polyoxyethylene alkylphenol ether were added and the solution was stirred to form a homogeneous suspension.

A 50 g. quantity of a 1 percent aqueous sodium sulfide solution (sulfur ion concentration 0.013 mole per litter) was added slowly, at a rate of 0.01–0.015 mole per minute, with stirring. The original suspension showed greenish-blue reflected color and pink transmitted color. During the reaction, the pink color disappeared and the greenish-blue color was enhanced. The suspension assumed a somewhat blackish color. At this stage of the reaction, the pH of the suspension was 6.5–7.0.

Stirring was continued for about five minutes and the decantation and washing procedure was repeated three times to eliminate the remainder of the salts and fine particles of lead sulfide formed by side reaction. The luster and grenish-blue color of the platelets increased measurably and the platelets assumed a blackish tone.

The amount of lead ion consumed during the reaction amounted to more than 100 times the amount of soluble lead acetate present in the suspension. By the amount of sodium sulfide consumed during the reaction in this experiment, the optical thickness of each layer of lead sulfide salts formed on the surface of the crystals was calculated to be at least about 10 m$\mu$.

To the washed crystalline platelets there was added 30 g. of 20 percent nitrocellulose solution in butyl acetate. The mixture was stirred until all of the crystals were transferred into nitrocellulose solution and the released water was then removed. The remainder of the water was expelled by solvent substitution and the flushed crystals were diluted to a concentration of 40 percent with butyl acetate. The resulting lustrous pearlescence is available for manufacturing simulated black pearls.

The so-called natural black pearls are almost bluish or purplish-blue in tone. These delicate tints are simulated by the bluish iridescence of black tone made according to the foregoing procedure. The tone of the simulated pearl can be further controlled by alternately coating the pearl bead with ordinary iridescent nacreous pigments of pink or blue color and with the black tone pigment of the present invention.

Example II

The procedure of Example I was repeated with the exception that a buffer solution consisting of 1.15 g. of sodium citrate and 11.5 cc. of sodium hydroxide of one normal concentration was added to the initial suspension of Example I. The resulting pearlescence can be used for producing iridescent acrylic or polyester sheets resembling in luster and color the black lip pearl oyster.

Example III

An attempt was made to form the pigment of black pearl tone by the simple chemical deposition of black substances on the surface of the crystals, rather than by the chemical reaction of the surface of the iridescent crystals. A product of poor luster resulted. Attempts to deposit black substances such as iron sulfide, nickel sulfide, copper sulfide, and cobalt sulfide according to a method similar to that described by Soloway in U.S. Patent 2,995,459 resulted in precipitation of the metal sulfides and thickened crystals of poor luster. In contrast with this method of adding a substance to the surface of the crystals, our novel method involves chemical substitution on the crystal surface and results in the correct optical thickness required to provide enhanced luster by the triple film effect.

Example IV

The procedure of Example I was repeated with the exception that basinc lead carbonate crystals of various iridescent colors were substituted for the greenish-blue iridescent crystals. The use of blue iridescent crystals (optical thickness about 300 m$\mu$) resulted in an indigo iridescent pearlescence of black tone. Pink iridescent crystals (optical thickness about 230–240 m$\mu$) gave a black tone pigment that was magenta in color. Yellow crystals (optical thickness about 200 m$\mu$) resulted in a golden pearlescence having a delicate tone.

Example V

A 50 g. quantity of pale yellow iridescent crystals of basic lead carbonate (optical thickness about 180 m$\mu$) in a thick slush was suspended in 100 cc. of pure water after adding 0.1 g. of barium alkylbenzene sulfonate, 1 g. of polyoxyethylene alkylamine, and about 0.1 g. of polyoxyethylene alkylphenol ether. This suspension was treated with 60 g. of a one percent sodium sulfide solution as described in Example I. The resulting pearlescence showed a smoky golden iridescence.

Example VI

The procedure of Example I was repeated with the following modifications: A 50 g. quantity of lead hydrogen arsenate in small platelets exhibiting a pale yellow iridescence (optical thickness about 180 m$\mu$ was suspended in 10 0g. of one percent ammoinum acetate solution. Hydrogen sulfide gas diluted to five percent in air was introduced over a period of about one minute. The resulting crystals showed golden-black toned luster after washing four times with pure water. The crystals were flushed with an alkyl resin made from ethylene glycol and sebacic acid to give a pearlescence useful for PVC blending and polystyrene, polyethylene, and polypropylene injection molding.

Example VII

Brownish-yellow iridescent crystals of lead hydrogen phosphate were substituted for the lead arsenate of the previous example. The resulting nacreous pigment exhibited a smoky copper tone. When flushed with alkyd resins, it is useful for injection moldings as described in Example VI.

We claim:

1. A highly lustrous nacreous pigment of black pearl tone consisting essentially of substantially uniform crystalline platelets characterized by strong reflectance and weak transmittance of incident light, said platelets having an optical thickness of about 180–2000 m$\mu$ and the individual platelets consisting of (1) a core of a lead salt having an index of refraction of about 1.8–2.1 and (2) substantially uniform outer upper and lower surface layers of mixed lead sulfide salts, each of said surface layers having an optical thickness of about 10–30 m$\mu$.

2. A pigment according to claim 1 wherein said platelets have an optical thickness of 180–400 m$\mu$.

3. A pigment according to claim 2 wherein said core is basic lead carbonate.

4. Method of making substantially uniform crystalline platelets of black pearl tone, said platelets being characterized by strong reflectance and weak transmittance of incident light, comprising (1) suspending, in an aqueous medium having a lead ion concentration of up to 0.01 mole per liter, substantially uniform light-transmitting crystalline platelets having an optical thickness of about 180–2000 m$\mu$, said platelets consisting of a lead salt having an index of refraction of about 1.8–2.1, and (2) adding thereto, at a rate of 0.001–0.02 mole of sulfur ion per minute, a solution of an inorganic sulfide, said solution having a sulfur ion concentration of 0.0001–0.03 mole per liter, to form by chemical reaction on the surface of said platelets substantially uniform surface layers of mixed lead sulfide salts, each of said surface layers having an optical thickness of 10–30 m$\mu$.

5. Method according to claim 4 wherein said inorganic sulfide is sodium sulfide.

6. Method according to claim 4 wherein said aqueous medium contains lead acetate in a concentration of about 0.005 mole per liter.

7. Method according to claim 4 wherein said crystalline platelets are basic lead carbonate and have an optical thickness of 180–400 m$\mu$.

8. Method according to claim 7 wherein the aqueous medium has a pH of 6–10.

9. Method according to claim 7 wherein the solution of inorganic sulfide has a sulfur ion concentration of 0.001–0.015 mole per liter and said solution is added at a rate of 0.01–0.015 mole of sulfur ion per minute.

10. Method according to claim 9 wherein the sulfur ion consumption is 0.0128–0.0384 mole of sulfur ion per 100 g. of crystalline platelets.

References Cited
UNITED STATES PATENTS 2,995,459    8/1961    Soloway     106—291

JAMES E. POER, Primary Examiner

U.S. Cl. X.R.

106—297, 308